Nov. 6, 1934.    H. J. CHEDESTER    1,979,252
RADIUS TURNING TOOL
Filed Feb. 1, 1933
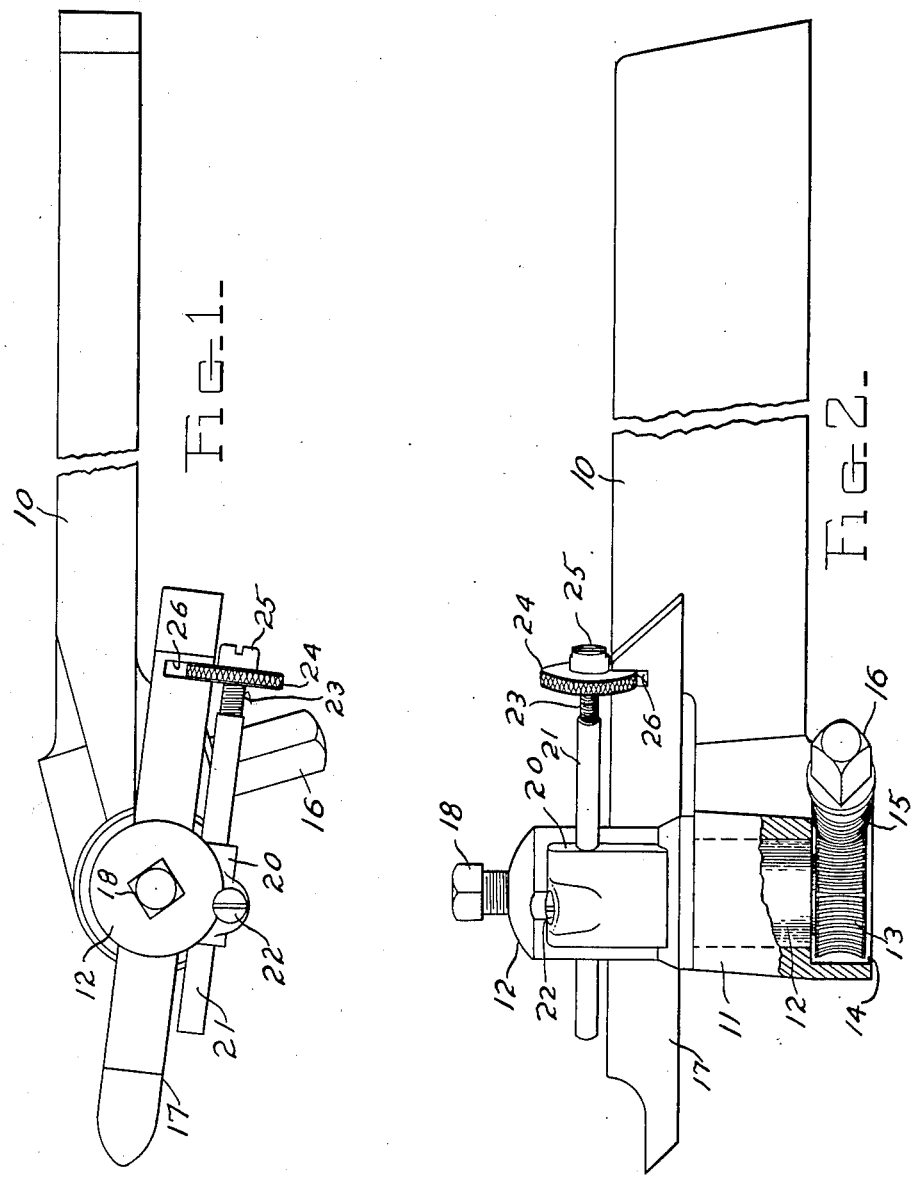
INVENTOR
*HARRY J. CHEDESTER*
BY
*Robert A. Lavender*
ATTORNEY Patented Nov. 6, 1934

1,979,252

UNITED STATES PATENT OFFICE 1,979,252

RADIUS TURNING TOOL

Harry J. Chedester, United States Navy

Application February 1, 1933, Serial No. 654,690

2 Claims. (Cl. 29—98)

(Granted under the act of March 3, 1883, as amended April 30, 1928; 370 O. G. 757)

This invention relates to a radius tool holder and has for an object to provide an improved tool holder of such a design that it, together with the cutting tool, can be rotated through an arc of over 90 degrees by means of a worm and gear. In addition to the rotary motion of the tool holder, the position of the cutting tool can also be controlled by means of an adjusting screw.

Another object of this invention is to provide a manually operated lathe tool holder by means of which the holder carrying the cutting tool bit can be rotated in a horizontal plane through an arc or more than 90 degrees by the use of a worm and gear.

A further object of this invention is to provide a manually operated lathe tool holder of the kind described, by means of which the position of the cutting tool bit relative to the tool holder can be quickly and accurately changed by means of a sliding and a screw adjustment.

A further object is to provide a tool of such a design that any size of concave radius can be quickly and accurately cut by inexperienced lathe operators.

With the above and other objects in view, this invention comprises the features hereinafter set forth and claimed, and disclosed in the accompanying drawing wherein:

Fig. 1 is a top plan view of the tool holder in operative position;

Fig. 2 is a side view of Fig. 1 partly broken away at the worm and gear.

There is shown at 10 a holder body at one end of which is formed a well 11 to receive a rotary holder 12 therein. Keyed to the bottom of the rotary holder 12 is a gear 13 within extension 14 of the well 11. The gear 13 is in mesh with a worm shaft 15 journaled through the extension 14 and having a squared control head 16 whereby the worm shaft 15 may be turned to rotate the holder 12 through the intermediary of the gear 13. The rotary holder 12 is slotted to receive the tool 17 projecting therethrough and a set screw 18 projects down through the top of the holder 12 to lock the tool 17 in position.

Before tool 17 is locked in position by the set screw 18, it is adjusted to the desired position by means of the following mechanism: An integral flange 20 provided on the side of holder 12 has an aperture formed therethrough parallel to the slot which receives the tool 17. This aperture receives a slide adjustment shaft 21 which is locked in position within the flange 20 by means of a set screw 22. The end of the shaft 21 is internally threaded to receive a threaded projecting screw 23 having a knurled operating head 24, the handle 24 being locked on the screw 23 by means of a nut 25. The non-cutting end of tool 17 is slotted as at 26 and the knurled handle 24 of the adjustment screw 23 projects therethrough.

In order to adjust the tool 17 accurately in position, the set screw 18 and the set screw 22 are both loosened allowing the shaft 21 and tool 17 to slide through their respective parallel apertures in the rotary holder 12 until the tool 17 is approximately in the desired position. The set screw 22 is then tightened and tool 17 is given a final adjustment by rotating the knurled handle 24, thus drawing tool 17 with it through the intermediary of slot 26. When the final adjustment has been completed, set screw 18 is then tightened, thereby locking tool 17 in the desired final adjustment. The rotary holder 12 with tool 17 in the proper position can then be rotated by means of the gear 13 and worm shaft 15 operated by an appropriate tool placed on the head 16.

It will be understood that the foregoing description and accompanying drawing comprehend only the general and preferred embodiments of my invention, and that various changes may be made therein within the scope of the appended claims without sacrificing any of the advantages of the invention.

The invention described herein may be manufactured and used by or for the Government of the United States of America for governmental purposes without the payment of any royalty thereon:

I claim:

1. Means for adjustably securing a tool in a tool holder for quick rough and quick fine adjustment comprising a pair of parallel shaftways extending through said tool holder, one of said shaftways slidably receiving said tool therein, a shaft slidably received in said second shaftway, means extending into each shaftway for individually locking said tool and said shaft against movement, means on said shaft adjustably securing said tool to said shaft, whereby said tool and shaftway may be moved simultaneously as a unit for rough adjustment when both locking means are unlocked and may be moved relative to each other for fine adjustment when one of said locking means is unlocked.

2. Means for adjustably securing a tool in a tool holder for quick rough and quick fine adjustment comprising a pair of parallel shaftways extending through said tool holder, one of said shaftways slidably receiving said tool therein, a shaft slidably received in said second shaftway, means extending into each shaftway for individually locking said tool and said shaft against movement, means on said shaft adjustably securing said tool to said shaft, whereby said tool and shaftway may be moved simultaneously as a unit for rough adjustment when both locking means are unlocked and may be moved relative to each other for fine adjustment when one of said locking means is unlocked, said latter means comprising a disc threadedly secured to said shaft and a slot in said tool into which the periphery of said disc extends.

HARRY J. CHEDESTER.